United States Patent

Takeuchi et al.

[11] Patent Number: 5,816,093
[45] Date of Patent: Oct. 6, 1998

[54] METHOD AND TOOL FOR FORMING A TAPERED HOLE IN A CYLINDRICAL WORK BY PUNCHING EXTRUDING

[75] Inventors: Hirosato Takeuchi; Shigeru Yasuda; Haruo Kubo, all of Tokyo, Japan

[73] Assignee: Nitto Kohki Co., Ltd., Japan

[21] Appl. No.: 809,682

[22] PCT Filed: Sep. 27, 1995

[86] PCT No.: PCT/JP95/01949

§ 371 Date: Jun. 25, 1997

§ 102(e) Date: Jun. 25, 1997

[87] PCT Pub. No.: WO96/09904

PCT Pub. Date: Apr. 4, 1996

[30] Foreign Application Priority Data

Sep. 29, 1994 [JP] Japan .................................. 6-234811
Aug. 3, 1995 [JP] Japan .................................. 7-198435

[51] Int. Cl.[6] .......................... B21D 28/14; B21D 28/28
[52] U.S. Cl. ................................. 72/327; 72/325; 72/335; 83/54; 83/686
[58] Field of Search ........................... 72/335, 327, 333, 72/328; 83/54, 686

[56] References Cited

U.S. PATENT DOCUMENTS

| 2,843,927 | 7/1958 | Stock | 72/335 |
| 3,044,167 | 7/1962 | Mathieu | 72/327 |
| 3,494,168 | 2/1970 | Williamson | 72/335 |
| 4,072,039 | 2/1978 | Nakanishi | 72/335 |
| 4,621,553 | 11/1986 | Gruchalski | 83/54 |

FOREIGN PATENT DOCUMENTS

| 53-2437 | 1/1978 | Japan . |
| 56-77028 | 6/1981 | Japan . |
| 146428 | 9/1982 | Japan | 72/370 |
| 70930 | 4/1983 | Japan | 72/327 |
| 59-174233 | 10/1984 | Japan . |
| 63-95623 | 6/1988 | Japan . |
| 1367639 | 9/1974 | United Kingdom | 72/327 |

OTHER PUBLICATIONS

Press Working Handbook dated Oct. 25, 1975.
Press Punching and Die Design dated Jan. 15, 1965.

*Primary Examiner*—Daniel C. Crane
*Attorney, Agent, or Firm*—Nixon & Vanderhye

[57] ABSTRACT

This invention provides a forming method capable of forming tapered through holes at once with a single pressing operation. A hole is formed in a work with a piercing punch 1 mounted on a press by using a small-diameter punching portion 1a formed on the distal end of the punch 1. A hole 11 formed at this time has a section with an open lower end portion by pressing. By using this hole 11 as a guide, a tapering portion 1b having a diameter slightly larger than the diameter of this hole and a tapered surface T forms a tapered surface on the inner surface of the hole 11 in accordance with plastic working. A "burr 3a" is formed on the edge of the hole 11 by this plastic working. Formation of this "burr 3a" is prevented with a pressure portion 1c formed on the piercing punch 1. When the above process is performed in a single pressing operation, a plurality of tapered through holes can be formed easily.

6 Claims, 4 Drawing Sheets

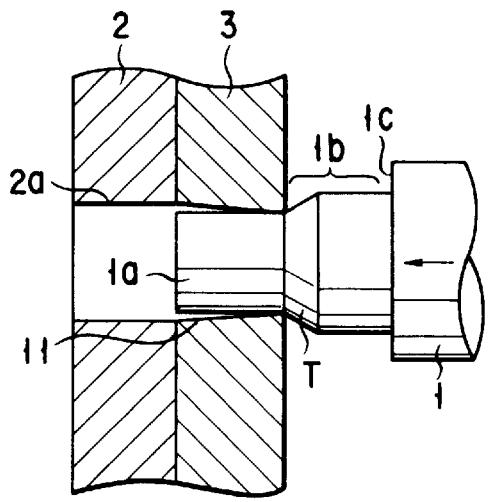
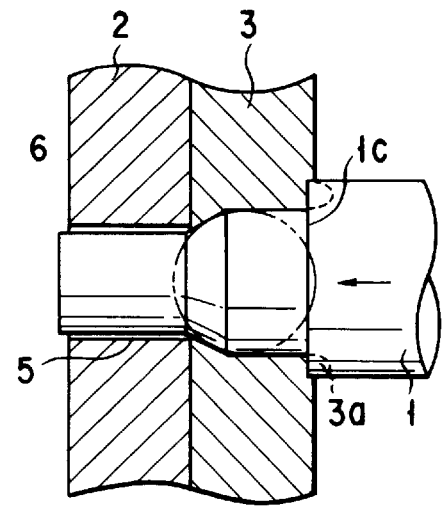
FIG. 3A        FIG. 3B
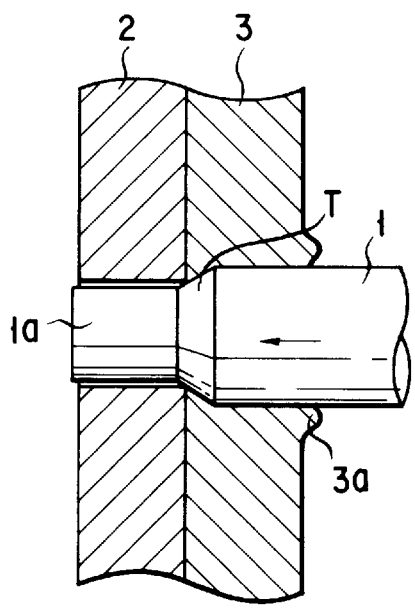
FIG. 4

METHOD AND TOOL FOR FORMING A TAPERED HOLE IN A CYLINDRICAL WORK BY PUNCHING EXTRUDING

This application is a 371 of PCT/JP95/01949, filed Sep. 27, 1995.

TECHNICAL FIELD

The present invention relates to a method for forming a tapered through hole in a work by pressing and a tool therefor, and, more specifically, in a pipe joint in which a plug and a socket can be locked with each other by utilizing, e.g., a locking ball, to a method for forming a tapered hole serving to hold a locking ball formed on a socket side by pressing and a hole forming tool therefor.

BACKGROUND ART

A locking mechanism used in a conventional pipe joint will be described with reference to the accompanying drawings. FIG. 9 is a sectional view of the pipe joint.

Referring to FIG. 9, the pipe joint comprises a socket 20 and a plug 30. The plug 30, having a communicating hole 33, has a large-diameter portion having an outer circumferential groove 31 to engage with locking balls (to be described later) provided on the socket 20 side, and a small-diameter portion 32 on its end that can be freely inserted into the socket.

The socket 20 having a communicating hole 26 has a front cylinder 21 in which the plug 30 is to be inserted, and a rear cylinder 21' to be connected to the front cylinder 21 with a screw 25. A packing 22 is disposed between the front cylinder 21 and the rear cylinder 21', and a valve body 24 biased by the biasing force of a spring 23 toward the packing 22 is disposed. When the plug 30 is not inserted in the socket, this valve body 24 abuts against the packing 22 with the biasing force of the spring 23 to shut off the communicating hole 26. Tapered through holes 27 are formed in the front cylinder 21 equidistantly in the circumferential direction to extend in the radial direction, and locking balls 28 are fitted in the tapered through holes 27 such that their spherical portions project over the inner surface of the front cylinder 21 to engage in the outer circumferential groove 31 of the plug 30. An operation sleeve 29 elastically biased by a spring 29a is fitted on the outer circumferential surface of the front cylinder 21, and a pressure surface 29b for pressing the locking balls 28 toward the center is formed on the sleeve 29.

When the operation sleeve 29 is moved to the right in FIG. 9 against the biasing force of the spring 29a, inserting the plug 30 into the socket 20 causes the locking balls 28 arranged in the front cylinder 21 to project into the outer circumferential groove 31 formed in the plug 30. Simultaneously, the valve body 23 is also pushed to the right in FIG. 9 by the distal end of the plug 30 to open the flow channel, thereby causing the communicating holes 26 and 30 of the socket and plug to communicate with each other. While the locking balls 28 engage in the outer circumferential groove 31, when the operation sleeve 29 is released, the sleeve is returned to the position shown in FIG. 9 by the biasing force of the spring 29a, and the locking balls. 28 are pushed inward in the radial direction by the pressure surface 29b of the operation sleeve 29 to maintain engagement with the outer circumferential groove 31.

As described above, in the conventional pipe joint, when connecting a plug and a socket, a locking mechanism utilizing locking balls is employed. The locking balls 28 are generally accommodated in the tapered through holes 27 formed in the socket, as described above. Therefore, the locking balls 28 will not come off toward the center of the front cylinder 21 due to the effect of the tapered through holes 27 when, e.g., assembling the socket.

The tapered through holes 27 formed in the front cylinder 21 are usually located at positions equally dividing the outer circumference of the front cylinder into a plurality of portions. Conventionally, to form these tapered through holes, a boring machine, e.g., a drilling machine, is used while indexing the positions on the outer circumference. Holes are formed one by one by a taper drill, and are finished by a reamer.

However, to form tapered through holes one by one by using the taper drill and the reamer is very cumbersome. As the service life of the taper drill and the reamer is comparatively short, the number of times of exchanging the drill and reamer increases, and accordingly the size control is cumbersome.

DISCLOSURE OF INVENTION

It is, therefore, an object of the present invention to provide a tapered through hole forming method capable of forming tapered through holes as described above at once by pressing and a tool therefor, thus solving the problems described above. When the hole forming method or the hole forming tool of the present invention is employed, a plurality of tapered through holes can be formed in a work at once by pressing. As a result, the manufacturing efficiency can be largely improved.

In order to achieve the above object, according to the first solution employed by the present invention, there is provided a hole forming method for forming a tapered through hole in a work by pressing, characterized by fitting and fixing the work on an outer circumferential surface of a cylindrical sleeve having a hole for punching and serving as a die, performing punching to form a punched hole in the work with a first punch having a smaller diameter than that of the hole of the die, and thereafter moving a second punch in this hole by using the punched hole as a guide, thereby performing plastic working for the punched hole into a tapered through hole with the second punch. In this working, a burr is prevented from being formed on a peripheral edge of the hole with a pressure portion formed on the second punch.

According to the second solution, there is provided a tapered through hole forming tool characterized in that the tool is used when forming a tapered through hole in a work by pressing, and a small-diameter first punch for performing punching to form a punched hole in the work and a second punch for performing plastic working for the punched hole by using the punched hole as a guide, thus forming the hole into a tapered through hole, are continuously formed in the tool in an axial direction. A pressure portion for preventing a burr from being formed on a peripheral edge of the punched hole by plastic working with the second punch is formed on the tool.

According to the third solution, there is provided a tapered through hole forming tool and a die characterized in that the tool and the die are used when forming a tapered through hole in a work by pressing, a small-diameter first punch for performing punching to form a punched hole in the work and a second punch for performing plastic working for the hole by using the punched hole as a guide, thus forming the hole into a tapered through hole, are continuously formed in the tool in an axial direction, and the die is individually formed

BRIEF DESCRIPTION OF DRAWINGS

FIGS. 3A and 3B are respectively views for explaining formation of the tapered through holes;

FIG. 4 is a view for explaining boring by using another piercing punch;

BEST MODE FOR CARRYING OUT THE INVENTION

Figure 1:
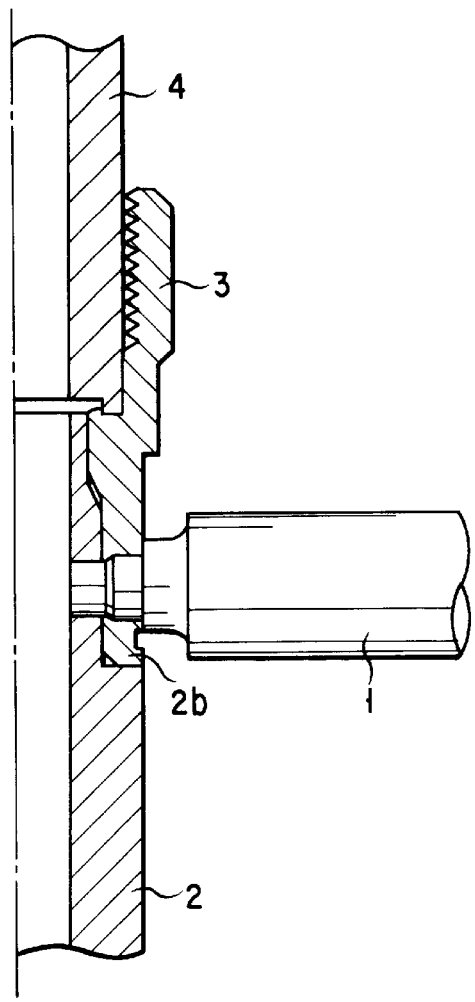
FIG. 1 is a view for explaining a tapered through hole forming method according to the first embodiment of the present invention.

A hole forming method for forming a tapered through hole according to the first embodiment of the present invention will be described with reference to the accompanying drawings. FIG. 1 is a view for explaining how to form a tapered through hole in the front cylinder of a pipe joint in accordance with this hole forming method, FIG. 2 is an enlarged front view of a piercing punch used in this hole forming method, FIGS. 3A and 3B are views for explaining the process of forming a tapered through hole with this piercing punch, and FIG. 4 is a view for explaining the tapered through hole formation with a piercing punch having no pressure portion.

Referring to FIG. 1, reference numeral 1 denotes a piercing punch for forming a tapered through hole in a front cylinder serving as a work; and 2, a cylindrical sleeve serving as a die. The die is inserted in the front cylinder and cooperates with the piercing punch 1 to form a tapered through hole. The die is fixed to one end of a press machine non-slidably and non-rotatably with a jig (not shown). Reference numeral 3 denotes a front cylinder serving as the work. The front cylinder 3 is inserted in one end of the die and held on the outer surface of the die. Reference numeral 4 denotes a fixing member for fixing the front cylinder 3 mounted on the die.

The piercing punch 1 is slidably held at one end of the press machine (not shown) with a jig. While it moves forward, the piercing punch 1 cooperates with the die 2 in a manner to be described later to form a tapered through hole in the front cylinder 3.

Figure 2:
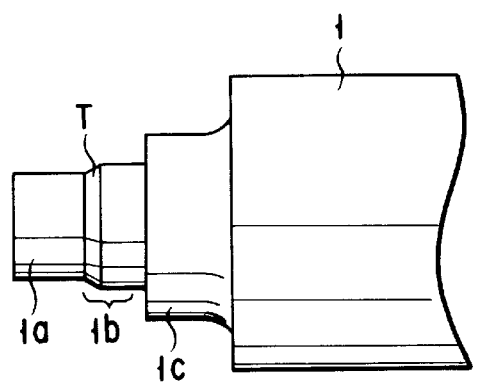
FIG. 2 is an enlarged view of the main part of a piercing punch used in forming the tapered through hole.

In the piercing punch 1 used for forming the tapered through hole, a punching portion 1a (first punch), a tapering portion 1b (second punch) having a tapered surface T, and a pressure portion 1c are continuously formed in the axial direction in this order from the distal end portion, as shown in FIG. 2.

The punching portion 1a has a function of forming a hole in the work and has a circular section of the same diameter.

The tapering portion 1b having the tapered surface T has a function of forming a tapered surface by plastic working for the inner surface of the hole while it moves in the above punched hole as a guide, and has the tapered surface T having a predetermined length in the axial direction and a columnar portion continuously formed from the upper end of the maximum-diameter portion of the tapered surface. The columnar portion has a circular section of a diameter larger than that of the punching portion 1a. The length of the tapered surface T in the axial direction is determined by considering the stroke of the punch and the like in accordance with the shape of the required tapered through hole.

The pressure portion 1c has a function of preventing a "burr" from being formed on the peripheral edge of the hole during plastic working. For this purpose, the pressure portion 1c is preferably formed conforming to the surface shape of the work. The respective lengths of the punching portion 1a and the tapering portion 1b, and the position of the pressure portion 1c are determined in accordance with the thickness of the work.

The die 2 positioned at the central portion of the work has a function of forming a hole in the work during hole formation by cooperating with the piercing punch 1, and discharging the metal fragments obtained by punching to the outside of the machine through the hole. For this purpose, as shown in FIGS. 3A and 3B, a hole 2a having a diameter slightly larger than the outer diameter of the punching portion 1a is formed in the die 2 at a position corresponding to the tool tip of the punch 1 described above. The tool tip of the punching portion can be inserted in this hole 2a. The front cylinder 3 is positioned as it abuts against a stepped portion 2b (see FIG. 1) formed on the outer surface of the die 2, and is fixed by the fixing member 4 slidably provided coaxially with the die.

Figure 9:
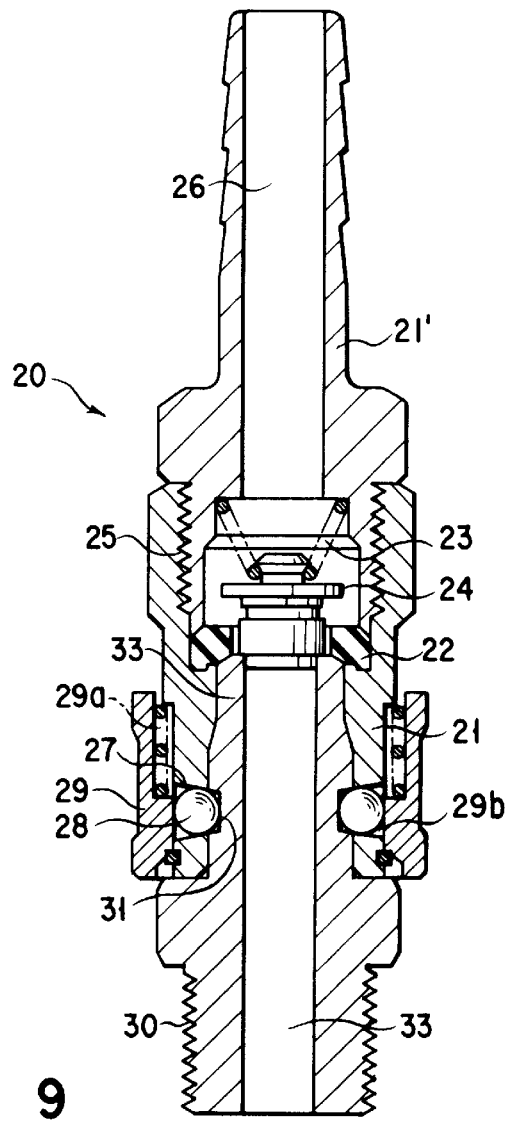
FIG. 9 is a sectional view of a conventional pipe joint.

A method of forming a tapered through hole in accordance with pressing by using the tool described above will be described. A plurality of tapered through holes are formed in the front cylinder of the pipe joint (FIG. 9). When the tapered through hole forming method of the present invention is adopted, if piercing punches are arranged to correspond to the positions of the plurality of tapered through holes, a plurality of tapered through holes can be formed simultaneously with a single pressing step. Attention will be paid to formation of one tapered through hole, and the process of forming this through hole will be described.

FIGS. 3A and 3B are enlarged views for explaining how to form a tapered through hole in the front cylinder as the work, in which FIG. 3A shows a punched state with a small-diameter punching portion, and FIG. 3B shows a state wherein the tapered surface T is formed on the inner surface of the hole by plastic working by using the hole formed in the work as a guide and formation of a "burr" on the edge of the hole during plastic working is prevented.

First, the operation of forming a hole in the work 3 with the small-diameter punching portion 1a is performed. As is known, a hole 11 formed at this time by pressing has a section with an open lower end portion, as shown in FIG. 3A.

Subsequently, as shown in FIG. 3B, by using the hole 11 as a guide, plastic working is performed with the tapering portion 1b having the tapered surface T and a diameter slightly larger than the diameter of the hole. By this plastic working, the tapered surface T is formed on the inner surface of the hole 11, as shown in FIG. 3B. The axial length of the tapered surface T formed on the inner surface of the hole 11 at this time can be freely changed by changing the tapered surface T formed on the piercing punch.

Along with this plastic working, a "burr 3a (see the broken line in FIG. 3B)" is formed on the edge of the hole 11 by deformation of the work. Formation of this "burr 3a" must be prevented. For this purpose, the piercing punch 1 of the present invention has the pressure portion 1c for preventing formation of the "burr 3a". Even if a "burr" is formed by plastic working, the pressure portion 1c formed on the upper portion of the tapering portion 1b having the tapered surface T as shown in FIG. 3B can press the peripheral edge of the hole 11. It is preferable that the pressure portion 1c that prevents formation of the "burr 3a" have a shape matching the shape of the outer surface of the work (if the outer surface is a curved surface, a shape matching this curved surface). In this embodiment, the piercing punch 1 having the flat pressure portion 1c is used.

When tapering described above is performed, the "burr 3a" may be formed, and sometimes the material of the front cylinder 3 plastically deforms to enter a small gap between the die 2 and the front cylinder 3, and further a small gap 5 between the punch 1 and the die 2, thus forming a "flush". This "flush" is usually sheared by a corner portion 6 of the die 2 when removing the front cylinder 3 from the die 2. In a state wherein the flush is not sufficiently sheared but remains, when the front cylinder 3 is assembled as a pipe joint, this "flush" hinders assembly of the pipe joint. For this reason, it is also necessary to form the corner portion 6 more sharply so that the "flush" can be completely cut off with the corner portion 6 of the die 2.

The second embodiment will be described with reference to FIG. 5. The second embodiment is related to a die 2, and is characterized in that the die 2 is individually provided for each hole formed in a front cylinder 3 and that each die is constituted by a tapered member 47 that strongly urges the die against the inner circumferential surface of the front cylinder 3 in order to prevent formation of the "flush" described above.

Figure 5:
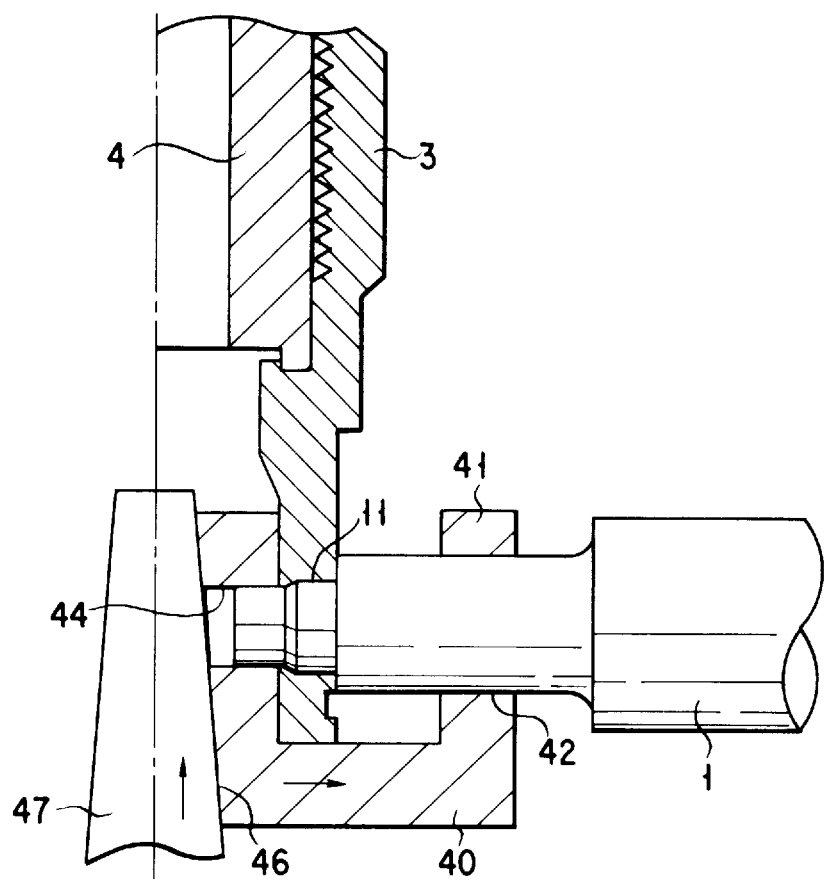
FIG. 5 is an enlarged view of the main parts of a piercing punch and a die used in a tapering method according to the second embodiment.
Figure 6:
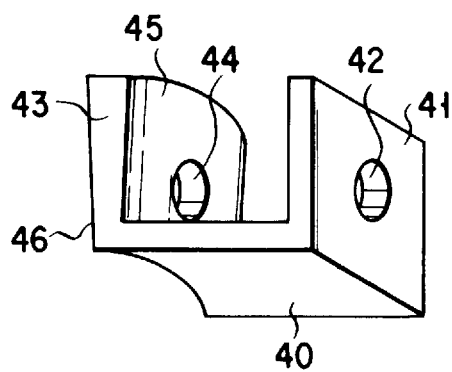
FIG. 6 is a perspective view of the die shown in FIG. 5.

More specifically, referring to FIG. 5, reference numeral 40 denotes a die. The die 40 is arranged for each of holes formed in the front cylinder 3 at positions equally dividing the entire circumference of the front cylinder 3 into four. As shown in FIG. 6, each die 40 has a U shape when seen from the side. A hole 42 is formed in one side 41 of the U shape to slidably hold a piercing punch 1, and a hole 44 is formed in the other side 43 of the U shape to cooperate with the piercing punch 1 in order to form a hole in the front cylinder 3. An inner side surface 45 of the other side 43 has a shape matching the inner circumferential surface of the front cylinder 3 serving as a work (in this embodiment, as the inner circumferential surface is circular, the inner side surface 45 is circular to match it). A tapered surface 46 is formed in the outer side surface of the other side 43 to correspond to a tapered member 47 (see FIG. 5) that eliminates the gap formed between the die 40 and the front cylinder 3 when the die 40 is strongly urged against the front cylinder. In FIG. 5, reference numeral 4 denotes a fixing member having the same structure as that of the first embodiment described above.

To form a tapered through hole in the front cylinder 3 serving as the work by using this die, first, while the front cylinder 3 is fixed with the fixing member 4, the die 40 is positioned and arranged with respect to the front cylinder 3 to correspond to the piercing punch, and the die 40 is urged against and fixed on the front cylinder 3 while pushing in the tapered member. While the die 40 is fixed in this manner, the piercing punch 1 is operated, so that a tapered hole can be formed in the front cylinder 3 in the same manner as in the first embodiment. At this time, since the die 40 is strongly urged against the front cylinder 3 by the tapered member 47, the gap between the die 40 and the front cylinder 3 disappears, and formation of a flush can therefore be minimized.

In this embodiment, the die 40 is individually arranged for each tapered hole. However, a plurality of collet chuck-like dice in which the respective dice are separated by slits can be employed instead.

The third embodiment will be described with reference to FIG. 7 and FIGS. 8A and 8B. The third embodiment is related to a piercing punch 1, and is characterized in that a pressure portion 1c of the piercing punch is formed separately from the piercing punch 1.

Figure 7:
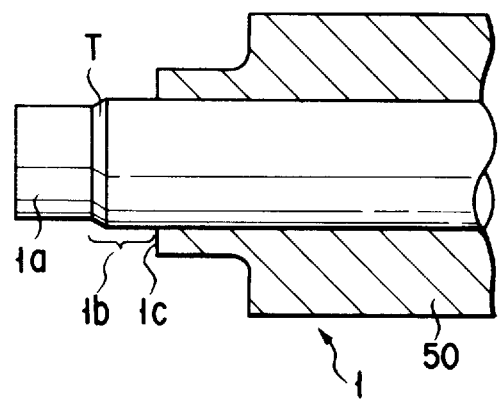
FIG. 7 is a partially sectional view of a piercing punch according to the third embodiment.
Figure 8A:
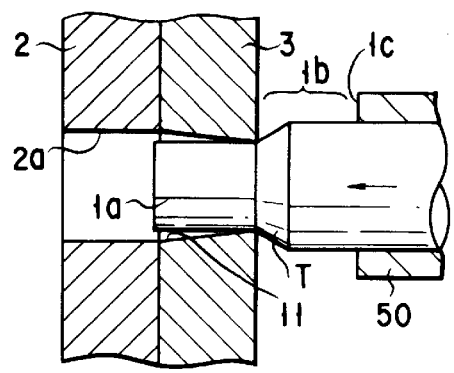
FIGS. 8A and 8B are respectively views for explaining enlargement by using the piercing punch shown in FIG. 7.

Referring to FIG. 7, in the piercing punch 1 used for forming a tapered through hole, a punching portion 1a (first punch) and a tapering portion 1b (second punch) having a tapered surface are continuously formed in the punch body in this order from the distal end portion, as shown in FIG. 7, and a pressure portion 50 is slidably formed on the outer circumferential surface of the punch body.

A method for forming a tapered through hole with this piercing punch will be described. FIG. 8A shows a punched state with the small-diameter punching portion, and FIG. 8B shows a state wherein a tapered surface is formed on the inner surface of the hole of the work in accordance with plastic working by using this hole as a guide and thereafter a "burr" formed on the outer periphery of the hole during plastic working is pressed with the pressure portion 50.

An operation of forming a hole in the work with the punching portion 1a is performed. As is known, a hole 11 formed at this time by pressing has a section with an enlarged lower end portion, as shown in FIG. 8A.

Figure 8B:
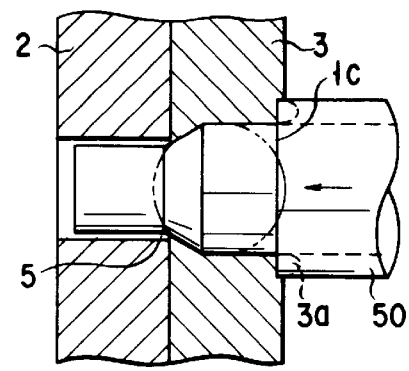

Subsequently, as shown in FIG. 8B, by using the hole 11 as a guide, the tapering portion 1b having a tapered surface T and a diameter slightly larger than the diameter of the hole is moved, thus performing plastic working. By this plastic working, a tapered surface is formed on the inner surface of the hole 11, as shown in FIG. 8B. The axial length of the tapered surface formed on the inner surface of the hole 11 at this time can be freely changed by changing the tapered surface T formed on the piercing punch.

Along with plastic working, a "burr 3a (see the broken line in FIG. 8B)" or a "flush" is formed on the edge of the hole 11 by deformation of the work, as described above. These "burr" and "flush" are treated as required in the same manner as in the above embodiments.

The other arrangements of the third embodiment are identical to those of the first embodiment.

As described above, in the present invention, punching, plastic working, and pressing can be performed by pressing with a single piercing punch. Thus, when compared to the conventional operation of forming holes one by one by using a taper drill and a reamer, the efficiency can be improved very remarkably.

In the above embodiments, a method for forming a tapered through hole by pressing and a tool used for this method have been described. However, even if punching, plastic working, and pressing are performed with different tools, the same effect as described above can be obtained. In this case, a guide portion having a diameter equal to the outer diameter of the punching portion of the hole forming tool may be formed in the distal end of a tapered surface that causes plastic deformation. As shown in FIG. 4, a tapered through may be formed in the front cylinder with a piercing punch having no pressure portion, and thereafter a "burr" or "flush" formed on the edge of the hole may be removed by machining. Furthermore, pressing becomes unnecessary depending on the clearance between the outer diameter of the front cylinder of the pipe joint and the inner diameter of the sleeve 29. Regarding tools, punching and plastic working may be performed with different tools. The present invention is not limited to formation of the tapered through hole of a pipe joint but can be applied to formation of various types of tapered through holes. The present invention can be practiced in various other forms without departing from its spirit or major features. It is to be understood that the invention is not limited to the illustrative embodiments described above.

INDUSTRIAL APPLICABILITY

As has been described above in detail, according to the present invention, since a tapered through hole can be formed by pressing, the punching efficiency can be improved greatly. If this tapered through hole forming method is employed, a plurality of tapered through holes can be formed simultaneously with a single pressing step by arranging punches in accordance with the positions of the plurality of tapered through holes. The hole positions need not be indexed unlike in the conventional case. If the hole forming tool of the present invention is used, a drilling operation with a taper drill, reaming, and the like can be made unnecessary. When compared to the drilling operation with a conventional taper drill, size management accompanying exchange of drills and reamers becomes unnecessary, and a through hole having a highly precise tapered shape can be formed. Also, a "burr" and "flush" formed in hole forming can be minimized in the present invention, and assembly of a pipe joint can be performed smoothly, leading to excellent effects.

We claim:

1. A method for pressing to form a tapered hole (27) radially extending in a cylindrical work (3) and tapered toward an inner circumferential side of the work, comprising the following steps of
    fitting the work (3) on a sleeve-like die (2) having a die hole (2a) on a circumferential wall portion thereof,
    punching, in the work (3), a through hole having a diameter increasing toward said inner circumferential side of the work by using a cylindrical punching portion (1a) formed at a distal end portion of a movable punch (1) along an axial direction of the die hole (2a) and slightly smaller in diameter than the die hole (2a),
    extruding a material of a peripheral portion of the through hole from an outer circumferential side of the work to the inner circumferential side by a tapering portion (1b) formed on said punch (1) and having a tapered surface (T) whose diameter increases from a diameter equal to that of said punching portion (1a) to a diameter larger than that of the die hole (2a), and
    forming a surface on an inner surface of the through hole, tapered toward the inner circumferential side of the work (3) by using the tapered surface (T) so that said surface increases in diameter from a point adjacent the inner circumferential side of said work towards said outer circumferential side.

2. A method according to claim 1, wherein when a material of a peripheral portion of the through hole is extruded from an outer circumferential side to the inner circumferential side, a peripheral edge of the through hole is pressed by a pressure portion (1c) disposed near said tapering portion (1b) on a side remote from said punching portion (1a) and having a diameter larger than that of said tapering portion, thereby preventing a burr of the material of the work (3).

3. An apparatus for pressing to form a tapered hole (27) radially extending in a cylindrical work (3) and tapered toward an inner circumferential surface of the work, comprising
    a die means (2, 40) having a mounting surface corresponding to the inner circumferential surface of the work and at least one die hole (2a, 44) open to said mounting surface, said mounting surface unit supporting an inner circumferential surface of the work (3), and
    a punch (1) movable along an axis of the die hole (2a, 44),
    said punch including a punching portion (1a) formed to have a diameter smaller than that of the die hole (2a) and cooperating with the die hole to form a through hole whose diameter increases on the inner circumferential side of the work (3), and a tapering portion (1b), having a tapered surface (T) whose diameter increases from a diameter equal to said punching portion (1a) to a diameter larger than that of the die hole (2a) in a direction remote from said punching portion (1a), for extruding a material of a peripheral portion of the through hole from an outer circumferential side of the work to the inner circumferential side such that a tapered surface is formed which increases in diameter from a point adjacent the inner circumferential side of said work toward said outer circumferential side, and said punching portion and said tapering portion being formed in an order named from a distal end side.

4. An apparatus according to claim 3, wherein said punch (1) has a pressure portion (1c) disposed near said tapering portion (1b) on a side remote from said punching portion (1a) and having a diameter larger than that of said tapering portion, said pressure portion preventing a burr of a material of the through hole when said tapering portion (1b) extrudes the material of the peripheral portion of the through hole from an outer circumferential side to the inner circumferential side.

5. An apparatus according to claim 3, wherein said die unit comprises a plurality of dies (40) which are arranged along a circumferential direction of an inner circumferential surface of the work (3) and each of which has one die hole (44), and a press member (47) disposed to be surrounded by said plurality of dies (40) to urge said mounting surface (45) of each die (40) against said inner circumferential surface of the work (3), thereby eliminating a gap between said each mounting surface (45) and the work (3).

6. An apparatus according to claim 5, wherein said punch (1) comprises a punch main body having said punching portion (1a) and said tapering portion (1b), and a slide member (50) free to be accommodated on an outer surface of said punch main body, said pressure portion being formed on said slide member.

* * * * *